United States Patent [19]
Irvine

[11] 3,800,897
[45] Apr. 2, 1974

[54] SUSPENSION SYSTEM
[75] Inventor: Gerald O. Irvine, Crosby, Minn.
[73] Assignee: Scorpion, Inc., Crosby, Minn.
[22] Filed: Apr. 27, 1972
[21] Appl. No.: 248,320

[52] U.S. Cl. .................................. 180/5 R, 305/27
[51] Int. Cl. ............................................. B62m 27/02
[58] Field of Search ........... 180/5 R; 305/27, 24, 25

[56] References Cited
UNITED STATES PATENTS
3,613,811  10/1971  Brandli ............................... 180/5 R
3,613,810  10/1971  Hetteen .............................. 180/5 R
3,701,394  10/1972  Hendrickson ....................... 180/5 R

*Primary Examiner*—Richard J. Johnson

[57] ABSTRACT

An improved vehicle suspension system having a chassis for supporting ground engaging means, a support arm pivotally connected at one end to the chassis and pivotally connected at its other end to the vehicle body, and an improved bias means associated with the chassis and support arm for resiliently suspending the vehicle body with respect to the chassis and for limiting its upward and rearward pivotal movement.

6 Claims, 5 Drawing Figures

PATENTED APR 2 1974  3,800,897
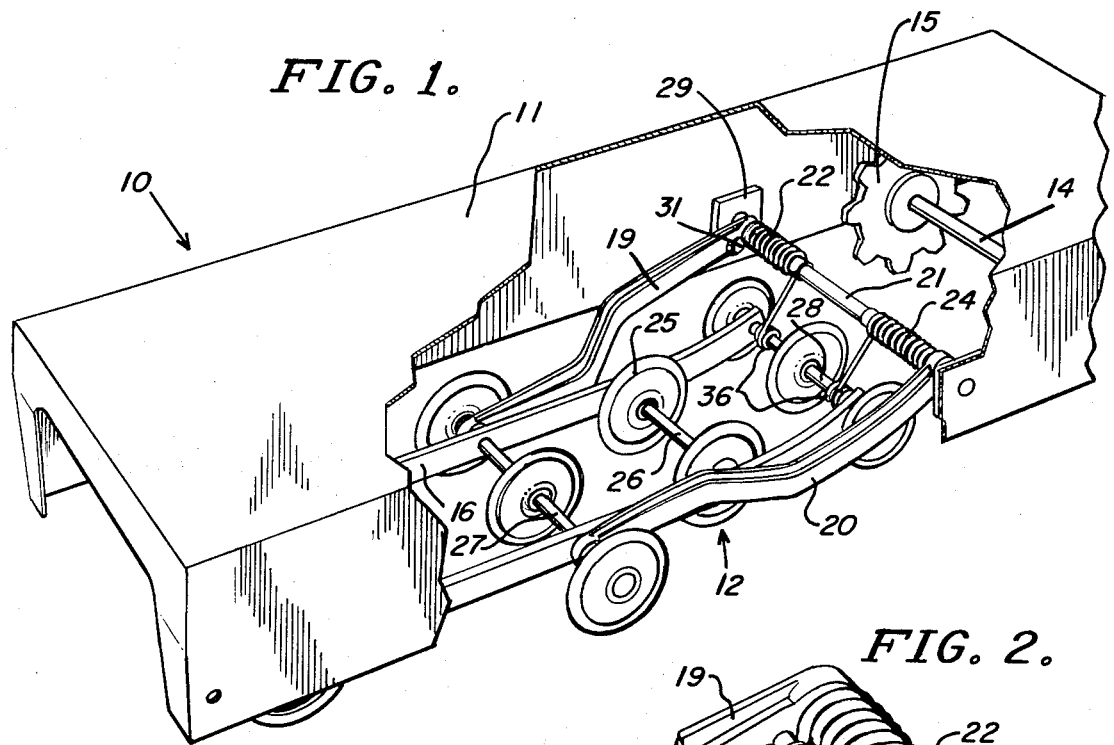
FIG. 1.
FIG. 2.
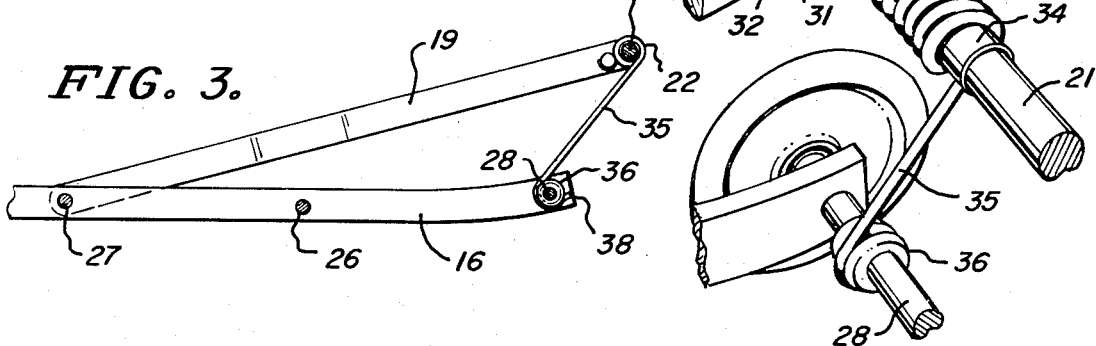
FIG. 3.
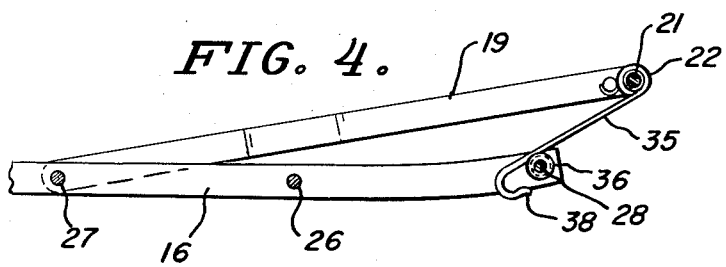
FIG. 4.
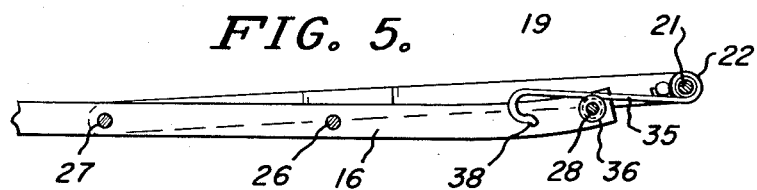
FIG. 5.

SUSPENSION SYSTEM

BACKGROUND OF THE INVENTION

The present invention relates generally to the field of vehicle suspension systems and more specifically to a suspension system for a small vehicle having an improved means for resiliently suspending one portion of the suspension system with respect to the other.

The suspension systems of many small vehicles such as snowmobiles include a chassis member adapted to support ground engaging means such as an endless track or a plurality of wheels, a support arm having one end connected with the chassis and another end connected with the vehicle body, a means associated with the chassis and the support arm for resiliently suspending the vehicle body with respect to the chassis, and a means for limiting the pivotal movement of the support arm with respect to the chassis.

One such example of a prior art structure is shown in the co-pending application, Ser. No. 177,378 filed Sept. 2, 1971. In that application a flat leaf spring is shown as being rigidly secured to and extending between the chassis and the support arm to resiliently support the vehicle body. That application also illustrates a stop member separate from the leaf spring for limiting the upward pivotal movement of the support arm with respect to the chassis. Although the performance of this structure is adequate, a need exists for a much simpler device.

SUMMARY OF THE INVENTION

In contrast to the prior art, the present invention provides a small vehicle suspension system having a single means serving both to resiliently suspend the vehicle body with respect to the chassis and to limit upward pivotal movement of the support arm with respect to the chassis. More specifically, the present invention contemplates the use of a torsion spring associated with the support arm and having a spring arm extending to and slideably engaging a portion of the chassis. Due to the tension in the spring, the support arm is biased upwardly with respect to the chassis to thereby resiliently support the vehicle body. The spring arm extending to the chassis is further provided with a hook means adapted for engagement with a corresponding means on the chassis to limit the upward pivotal movement of the support arm.

By controlling the strength of the spring and the length of the spring arm the desired cushionability of the vehicle and the correct position for stopping vertical travel of the vehicle body may be attained without need for readjustment by the purchaser of the vehicle. Consequently, the present invention provides for a much simpler system.

These and other objects and advantages of the present invention will become apparent with reference to the drawings, the description of the preferred embodiment, and to the appended claims.

DESCRIPTION OF THE DRAWINGS

FIG. 1 is a perspective view partially broken away of a portion of the vehicle body showing the suspension system of the present invention.

FIG. 2 is a close-up perspective view of the improved bias and stop means of the present invention.

FIG. 3 is a plan view of the suspension system of the present invention with the support arm in an extended position.

FIG. 4 is a plan view of the suspension system of the present invention with the support arm in an intermediate depressed position.

FIG. 5 is a plan view of the suspension system of the present invention with the support arm in a fully depressed position.

DESCRIPTION OF THE PREFERRED EMBODIMENT

Reference is first made to FIG. 1 in which is shown the suspension system 12 of the present invention resiliently supporting the vehicle body 11 of a small vehicle 10 such as a snowmobile, go-cart or the like. In the preferred embodiment the vehicle 10 is a snowmobile.

More specifically, the suspension system 12 includes a chassis comprising a pair of elongated members 16 and 18, a vehicle support means comprising a pair of support arms 19 and 20 and a bias or spring means comprising a pair of torsion springs 22 and 24. The elongated members 16 and 18 of the chassis are transversely spaced, one near each side of the vehicle 10, and extend parallel to the longitudinal axis of the vehicle, from the rearward end of the vehicle 10 toward its forward end.

Together, the members 16 and 18 support a plurality of transverse shafts or axles 26, 27 and 28, each of which in turn rotatably supports a plurality of bogie wheels 25. Although not illustrated, the bogie wheels 25 are adapted to engage the inside surface of an endless track which extends around a major portion of the suspension system 12 and which is driven by the drive shaft and sprocket 14 and 15 respectively. In lieu of the bogie wheels 25, it is contemplated that conventional slide rails (not shown) may be connected with the members 16 and 18 as the means for engaging the inside surface of the endless track. Also, for vehicles other than track vehicles or snowmobiles, it is contemplated that ground engaging means such as wheels may be rotatably connected to the chassis members 16 and 18.

Each of the members 16 and 18 is resiliently mounted with respect to the vehicle body 11 near its rearward end (not shown) by a conventional cushion or shock absorber. The forward end of each member 16 and 18 extends forwardly toward the front end of the vehicle 10 and is resiliently supported with respect to the vehicle body 11 by the support arms 19 and 20 and the spring members 22 and 24 as will hereinafter be explained.

Each of the support arms 19 and 20 is pivotally secured at one end to one of the chassis members 16 and 18 between the ends of said members 16 and 18 and each is pivotally secured at its other end to the vehicle body 11. Although the arms 19 and 20 may be secured to the members 16 and 18 at various points, the preferred embodiment illustrates the arms 19 and 20 as being pivotally connected to the shaft 27 which extends through each of the members 16 and 18. The shaft 27 is disposed approximately midway between the ends of the members 16 and 18. At their other ends, the arms 19 and 20 are pivotally connected to the vehicle body 11 by the shaft 21 which extends transversely across the vehicle body 11 and is mounted thereto by a mounting plate 29 secured to each side of the body 11.

As shown generally with reference to FIG. 1 and more specifically with reference to FIG. 2, the bias or spring means for resiliently supporting the vehicle body 11 with respect to the chassis comprises a pair of torsion spring members 22 and 24 each of which encircles the transverse shaft 21 near one side of the body 11. With specific reference to FIG. 2, each of the springs 22 and 24 includes a spring arm 35 extending downwardly from the shaft 21 toward the axle 28 where it slideably engages a spool 36 through which the axle 28 extends. The spool 36 includes a relatively annular groove into which the spring arm 35 is slideably seated and retained. The spool 36 may be either fixedly secured or rotatably mounted to the shaft 28. As shown in FIGS. 3, 4 and 5 the end of the arm 35 contains a hook 38 which is adapted to seat in the annular groove of the spool 36 to thereby limit the upward pivotal movement of the support arms 19 and 20 with respect to the chassis members 16 and 18.

The other end of each of the torsion springs 22 and 24 terminates in a hook portion 32 (FIG. 2) which is anchored about the pin 31. The orientation of each of the springs 22 and 24 is such that the spring arms 35 which engage the spools 36 tend to pivot the support arms 19 and 20 and thus the forward portion of the vehicle body 11 upwardly with respect to the chassis members 16 and 18. To reduce friction and to limit wear on the shaft 21, a cylindrical bushing 34 (FIG. 2) is disposed between the shaft 21 and each of the springs 22 and 24.

To insure that cushioning of the vehicle body 11 will be achieved, the relative position of the shafts 21 and 28 (FIG. 1) must be such that the spring arms 35 will exert a force having a downward component on the spools 36 and thus the shaft 28. Normally, with a structure of the type illustrated in the preferred embodiment, such a force will be exerted when the distance between the shaft 27 and the shaft 21 is greater than the distance between the shaft 27 and the shaft 28. However, it is contemplated that the orientation of the springs 22 and 24 could be reversed, in which case such a force would be exerted only if the distance between the shaft 27 and the shaft 21 is less than the distance between the shaft 27 and the shaft 28. It should be noted that the cushionability of the vehicle body 11 may be changed by modifying the strength of the torsion springs 22 and 24 or by varying the relative position of the shaft 21 with respect to the shaft 28.

By referring now to FIGS. 3, 4 and 5, the operation of the suspension system of the present invention may be summarized as follows: First, when the vehicle is in a rest position without a rider, the relative position of the support arms 19 and 20, the chassis members 16 and 18 and the spring arms 35 are as illustrated in FIG. 3. In this position the force exerted by the spring arms 35 urges the arms 19 and 20 upwardly with respect to the members 16 and 18 and the hook 38 at the end of the spring arm 35 limits the upward movement of the arms 19 and 20 by engaging the groove in the spool 36.

When a rider mounts the vehicle, a downward force is exerted on the body of the vehicle and thus on the shaft 21 thereby causing the elements of the suspension system to attain a position similar to that illustrated in FIG. 4. In this position the arms 19 and 20 are pivoted downwardly with respect to the chassis members 16 and 18 thus causing the arms 35 to slide along the groove in the spools 36 and to disengage the hooks 38 from the spools 36. It should be noted that in this position the downward force exerted by the arms 35 against the spools 36 is greater than that when the suspension system is in the position of FIG. 3 for two reasons. First, the downward component of the force exerted by the arms 35 on the spools 36 is greater, and secondly, the lever arm between the shaft 21 and the point at which the arm 35 engages the spool 36 is less than that in FIG. 3.

Finally, during operation, when the vehicle encounters a bump, the sudden upward thrust of the bump against the ground engaging means causes a sudden upward force to be exerted on the forward end of the chassis members 16 and 18 thus causing the elements of the suspension system to attain a relative position similar to that illustrated in FIG. 5. For the same reasons discussed in the preceding paragraph, the force of FIG. 5 urging the arms 19 and 20 upwardly with respect to the members 16 and 18 is greater than the force in either of FIGS. 3 or 4. Thus it can be seen that the cushioning force or the force urging the arms 19 and 20 upwardly with respect to the chassis members 16 and 18 increases as the arms 19 and 20 come closer to the members 16 and 18.

As discussed above, one of the purposes of the hook 38 is to limit the upward pivotal movement of the arms 19 and 20 with respect to the members 16 and 18 and to maintain a proper spacing between these elements when the vehicle is in a rest position. A further purpose of the hook 38 is to limit the upward pivotal movement of the arms 19 and 20 and thus the vehicle body during sudden acceleration. For example, when the vehicle is suddenly accelerated, a force acts on the vehicle body and the arms 19 and 20 tending to pivot them upwardly and rearwardly about the shaft 27. If the hooks 38 were not present, there would be no control of the rearward pivotal movement of the vehicle body 11 upon sudden acceleration, thus causing the rider to be thrown from the vehicle in many instances.

Although the description of the preferred embodiment of the present invention has been quite specific, it is contemplated that several modifications could be made without deviating from the spirit of the invention. Consequently, it is intended that the scope of the present invention be determined by the appended claims rather than by the description of the preferred embodiment.

I claim:

1. An improved vehicle suspension system for resiliently suspending the vehicle body comprising:

a chassis having a forward end and a rearward end and adapted to support ground engaging means;

a support arm having a first and second end, said support arm being pivotally connected near its first end to said chassis between the ends of said chassis and pivotally connected near its second end to the body of said vehicle;

bias means connected with one of said second end of said support arm and said chassis and having a spring arm extending to and slideably engaging the other of said second end of said support arm and said chassis for urging said second end of said support arm upwardly with respect to said chassis, said spring arm having a hook on the end thereof for limiting the upward movement of said support arm with respect to said chassis.

2. An improved vehicle suspension system for resiliently suspending the vehicle body comprising:
a chassis having a forward end and a rearward end and adapted to support ground engaging means;
a support arm having a first and second end, said support arm being pivotally connected near its first end to said chassis between the ends of said chassis and pivotally connected near its second end to the body of said vehicle;
bias means connected with said second end of said support arm and having a spring arm extending to and slidably engaging a portion of said chassis for urging said second end of said support arm upwardly with respect to said chassis, said spring arm including means for limiting the upward movement of said support arm with respect to said chassis.

3. An improved vehicle suspension system for resiliently suspending the vehicle body comprising:
a chassis having a forward end and a rearward end and adapted to support ground engaging means;
a pair of support arms each having a first and a second end with each of said support arms being pivotally connected near its first end to said chassis between the ends of said chassis and each being pivotally connected near its second end to the body of said vehicle;
a shaft extending between the second ends of said support arms;
bias means associated with each of said support arms, each of said bias means being connected with one of said second ends of said support arms, each including a torsion spring mounted on said shaft, and each including a spring arm extending to and slideably engaging a portion of said chassis for urging said second end of said support arm upward with respect to said chassis, said spring arm including means for limiting the upward movement of said support arm with respect to said chassis.

4. The improved vehicle suspension of claim 3 having a pair of spool members connected with said chassis for slideably cooperating with said spring arms.

5. The improved vehicle suspension of claim 4 wherein each of said spring arms includes a hook adapted to engage one of said spools to limit the upward movement of said support arms with respect to said chassis.

6. The improved vehicle suspension system of claim 5 wherein said spools are mounted on a transverse shaft of said chassis near the forward end of said chassis.

* * * * *